(12) United States Patent
Yang et al.

(10) Patent No.: US 12,602,936 B2
(45) Date of Patent: Apr. 14, 2026

(54) LONG-RANGE 3D OBJECT DETECTION USING 2D BOUNDING BOXES

(71) Applicant: NVIDIA Corporation, Santa Clara, CA (US)

(72) Inventors: Zetong Yang, Rockville, MD (US); Zhiding Yu, Cupertino, CA (US); Ren Hao Wang, Toronto (CA); Chris Choy, Los Angeles, CA (US); Anima Anandkumar, Pasadena, CA (US); Jose M. Alvarez Lopez, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 399 days.

(21) Appl. No.: 18/223,473

(22) Filed: Jul. 18, 2023

(65) Prior Publication Data

US 2024/0249538 A1 Jul. 25, 2024

Related U.S. Application Data

(60) Provisional application No. 63/440,326, filed on Jan. 20, 2023.

(51) Int. Cl.
*G06V 20/64* (2022.01)
*G06T 7/50* (2017.01)
(Continued)

(52) U.S. Cl.
CPC ................ *G06V 20/64* (2022.01); *G06T 7/50* (2017.01); *G06T 7/70* (2017.01); *G06T 7/80* (2017.01);
(Continued)

(58) Field of Classification Search
CPC ...... G06V 10/82; G06V 10/225; G06V 20/64; G06V 2201/07; G06T 7/80; G06T 7/70;
(Continued)

(56) References Cited

U.S. PATENT DOCUMENTS

2022/0188554 A1* 6/2022 Huang .................. G01S 13/931

OTHER PUBLICATIONS

Mousavian, Arsalan, et al. "3D Bounding Box Estimation Using Deep Learning and Geometry." arXiv preprint arXiv:1612.00496v2 (2017). (Year: 2017).*

(Continued)

*Primary Examiner* — Tracy Mangialaschi
(74) *Attorney, Agent, or Firm* — Zilka-Kotab, P.C.

(57) ABSTRACT

3D object detection is a computer vision task that generally detects (e.g. classifies and localizes) objects in 3D space from the 2D images or videos that capture the objects. Current techniques used for 3D object detection rely on machine learning processes that learn to detect 3D objects from existing images annotated with high-quality 3D information including depth information generally obtained using lidar technology. However, due to lidar's limited measurable range, current machine learning solutions to 3D object detection do not support detection of 3D objects beyond the lidar range, which is needed for numerous applications, including autonomous driving applications where existing close or midrange 3D object detection does not always meet the safety-critical requirement of autonomous driving. The present disclosure provides for 3D object detection using a technique that supports long-range detection (i.e. detection beyond the lidar range).

19 Claims, 11 Drawing Sheets

(51) Int. Cl.
| | |
|---|---|
| *G06T 7/70* | (2017.01) |
| *G06T 7/80* | (2017.01) |
| *G06V 10/22* | (2022.01) |
| *G06V 10/82* | (2022.01) |

(52) U.S. Cl.
CPC ............ *G06V 10/225* (2022.01); *G06V 10/82* (2022.01); *G06T 2207/20081* (2013.01); *G06T 2207/20084* (2013.01); *G06T 2207/30252* (2013.01); *G06V 2201/07* (2022.01)

(58) Field of Classification Search
CPC ............. G06T 7/50; G06T 2207/20081; G06T 2207/30252; G06T 2207/20084
See application file for complete search history.

(56) References Cited

OTHER PUBLICATIONS

Yang, Wankou, et al. "A multi-task Faster R-CNN method for 3D vehicle detection based on a single image." Applied Soft Computing 95 (2020): 106533. (Year: 2020).*

Brazil, Garrick, and Xiaoming Liu. "M3D-RPN: Monocular 3D Region Proposal Network for Object Detection." arXiv preprint arXiv: 1907.06038 (2019). (Year: 2019).*

Zhou, Xichuan, et al. "MoNet3D: Towards Accurate Monocular 3D Object Localization in Real Time." arXiv preprint arXiv: 2006.16007 (2020). (Year: 2020).*

Zhou et al., "VoxelNet: End-to-End Learning for Point Cloud Based 3D Object Detection," CVPR, 2018, pp. 4490-4499.

Ang et al., "PointPillars: Fast Encoders for Object Detection from Point Clouds," CVPR, 2019, pp. 12697-12705, retrieved from https://openaccess.thecvf.com/content_CVPR_2019/papers/Lang_PointPillars_Fast_Encoders_for_Object_Detection_From_Point_Clouds_CVPR_2019_paper.pdf.

Shi et al., "PointRCNN: 3D Object Proposal Generation and Detection from Point Cloud," CVPR, 2019, pp. 770-779, retrieved from https://openaccess.thecvf.com/content_CVPR_2019/papers/Shi_PointRCNN_3D_Object_Proposal_Generation_and_Detection_From_Point_Cloud_CVPR_2019_paper.pdf.

Yang et al., "3D-MAN: 3D Multi-frame Attention Network for Object Detection," CVPR, 2021, pp. 1863-1872, retrieved from https://openaccess.thecvf.com/content/CVPR2021/papers/Yang_3D-MAN_3D_Multi-Frame_Attention_Network_for_Object_Detection_CVPR_2021_paper.pdf.

Shi et al., "PV-RCNN: Point-Voxel Feature Set Abstraction for 3D Object Detection," CVPR, 2020, pp. 10529-10538, retrieved from https://openaccess.thecvf.com/content_CVPR_2020/papers/Shi_PV-RCNN_Point-Voxel_Feature_Set_Abstraction_for_3D_Object_Detection_CVPR_2020_paper.pdf.

Wang et al., "FCOS3D: Fully Convolutional One-Stage Monocular 3D Object Detection," ICCV, 2021, pp. 913-922, retrieved from https://openaccess.thecvf.com/content/ICCV2021W/3DODI/papers/Wang_FCOS3D_Fully_Convolutional_One-Stage_Monocular_3D_Object_Detection_ICCVW_2021_paper.pdf.

Li et al., "BEVFormer: Learning Bird's-Eye-View Representation from Multi-Camera Images via Spatiotemporal Transformers," arXiv, 2022, 20 pages, retrieved from https://arxiv.org/abs/2203.17270.

Geiger et al., "Vision meets robotics: The KITTI dataset," The International Journal of Robotics Research, vol. 32, Sep. 2013, 9 pages.

Wikipedia, "Braking distance," Wikipedia, 2023, 8 pages, retrieved from https://en.wikipedia.org/wiki/Braking_distance.

Li et al., "R4D: Utilizing Reference Objects for Long-Range Distance Estimation," ICLR, 2022, pp. 1-17.

FHWA, "Enhanced Night Visibility Series: Phase II—Study 4: Visual Performance During Nighttime Driving in Fog," Federal Highway Administration's (FHWA) Visibility Research Program, Technical report: FHWAHRT-04-137, Dec. 2005, 114 pages.

Caesar et al., "nuScenes: A multimodal dataset for autonomous driving," CVPR, 2020, pp. 11621-11631.

Peng et al., "DID-M3D: Decoupling Instance Depth for Monocular 3D Object Detection." ECCV, 2022, 18 pages, retrieved from https://www.ecva.net/papers/eccv_2022/papers_ECCV/papers/136610071.pdf.

Wilson et al., "Argoverse 2: Next Generation Datasets for Self-Driving Perception and Forecasting," 35th Conference on Neural Information Processing Systems (NeurIPS), 2021, 13 pages.

Qi et al., "Frustum PointNets for 3D Object Detection from RGB-D Data," CVPR, 2018, pp. 918-927, retrieved from https://openaccess.thecvf.com/content_cvpr_2018/papers/Qi_Frustum_PointNets_for_CVPR_2018_paper.pdf.

Yang et al., "3DSSD: Point-based 3D Single Stage Object Detector," CVPR, 2020, pp. 11040-11048.

Yang et al., "STD: Sparse-to-Dense 3D Object Detector for Point Cloud," ICCV, 2019, pp. 1951-1960, retrieved from https://openaccess.thecvf.com/content_ICCV_2019/papers/Yang_STD_Sparse-to-Dense_3D_Object_Detector_for_Point_Cloud_ICCV_2019_paper.pdf.

Yang et al., "IPOD: Intensive Point-based Object Detector for Point Cloud," arXiv, 2018, 9 pages, retrieved from https://arxiv.org/abs/1812.05276.

Qi et al., "PointNet: Deep Learning on Point Sets for 3D Classification and Segmentation," CVPR, 2017, pp. 652-660, retrieved from https://openaccess.thecvf.com/content_cvpr_2017/papers/Qi_PointNet_Deep_Learning_CVPR_2017_paper.pdf.

Qi et al., "PointNet++: Deep Hierarchical Feature Learning on Point Sets in a Metric Space," 31st Conference on Neural Information Processing Systems (NIPS 2017), 2017, 10 pages, retrieved from https://proceedings.neurips.cc/paper_files/paper/2017/file/d8bf84be3800d12f74d8b05e9b89836f-Paper.pdf.

Li et al., "PointCNN: Convolution On X-Transformed Points," 32nd Conference on Neural Information Processing Systems (NeurIPS), 2018, pp. 1-11.

Zhao et al., "Point Transformer," ICCV, 2021, 10 pages, retrieved from https://openaccess.thecvf.com/content/CCV2021/papers/Zhao_Point_Transformer_ICCV_2021_paper.pdf.

Yang et al., "A Unified Query-based Paradigm for Point Cloud Understanding," CVPR, 2022, pp. 8541-8551, retrieved from https://openaccess.thecvf.com/content/CVPR2022/papers/Yang_A_Unified_Query-Based_Paradigm_for_Point_Cloud_Understanding_CVPR_2022_paper.pdf.

Yang et al., "CN: Channel Normalization For Point Cloud Recognition," ECCV, 2020, 16 pages, retrieved from https://www.ecva.net/papers/eccv_2020/papers_ECCV/papers/123550596.pdf.

Graham et al., "3D Semantic Segmentation with Submanifold Sparse Convolutional Networks," CVPR, 2018, pp. 9224-9232, retrieved from https://openaccess.thecvf.com/content_cvpr_2018/papers/Graham_3D_Semantic_Segmentation_CVPR_2018_paper.pdf.

Graham et al., "Sparse 3D convolutional neural networks," BMVC, 2015, 11 pages, retrieved from https://arxiv.org/abs/1505.02890.

Choy et al., "4D Spatio-Temporal ConvNets: Minkowski Convolutional Neural Networks," CVPR, 2019, pp. 3075-3084, retrieved from https://openaccess.thecvf.com/content_CVPR_2019/papers/Choy_4D_Spatio-Temporal_ConvNets_Minkowski_Convolutional_Neural_Networks_CVPR_2019_paper.pdf.

Yan et al., "SECOND: Sparsely Embedded Convolutional Detection," Sensors, vol. 18, 2018, pp. 1-17.

Yang et al., "PIXOR: Real-time 3D Object Detection from Point Clouds," CVPR, 2018, pp. 7652-7660, retrieved from https://openaccess.thecvf.com/content_cvpr_2018/papers/Yang_PIXOR_Real-Time_3D_CVPR_2018_paper.pdf.

Yin et al., "Center-based 3D Object Detection and Tracking," CVPR, 2021, pp. 11784-11793.

Bewley et al., "Range Conditioned Dilated Convolutions for Scale Invariant 3D Object Detection," 4th Conference on Robot Learning (CoRL), 2020, pp. 1-15.

Sun et al., "RSN: Range Sparse Net for Efficient, Accurate LiDAR 3D Object Detection," CVPR, 2021, pp. 5725-5734.

Li et al., "Vehicle Detection from 3D Lidar Using Fully Convolutional Network," arXiv, 2016, 8 pages, retrieved from https://arxiv.org/abs/1608.07916.

(56) References Cited

OTHER PUBLICATIONS

Chai et al., "To the Point: Efficient 3D Object Detection in the Range Image with Graph Convolution Kernels," CVPR, 2021, pp. 16000-16009.

Fan et al., "RangeDet: In Defense of Range View for LiDAR-based 3D Object Detection," ICCV, 2021, pp. 2918-2927, retrieved from https://openaccess.thecvf.com/content/ICCV2021/papers/Fan_RangeDet_In_Defense_of_Range_View_for_LiDAR-Based_3D_Object_ICCV_2021_paper.pdf.

He et al., "Deep Residual Learning for Image Recognition," The IEEE Conference on Computer Vision and Pattern Recognition (CVPR), 2016, pp. 770-778, retrieved from http://openaccess.thecvf.com/content_cvpr_2016/html/He_Deep_Residual_Learning_CVPR_2016_paper.html.

Wang et al., "Probabilistic and Geometric Depth: Detecting Objects in Perspective," 5th Conference on Robot Learning (CoRL), 2021, pp. 1-11.

Brazil et al., "M3D-RPN: Monocular 3D Region Proposal Network for Object Detection," ICCV, 2019, pp. 9287-9296, retrieved from https://openaccess.thecvf.com/content_ICCV_2019/papers/Brazil_M3D-RPN_Monocular_3D_Region_Proposal_Network_for_Object_Detection_ICCV_2019_paper.pdf.

Simonelli et al., "Disentangling Monocular 3D Object Detection," ICCV, 2019, pp. 1991-1999, retrieved from https://openaccess.thecvf.com/content_ICCV_2019/papers/Simonelli_Disentangling_Monocular_3D_Object_Detection_ICCV_2019_paper.pdf.

Chen et al., "DSGN: Deep Stereo Geometry Network for 3D Object Detection," CVPR, 2020, pp. 12536-12545.

Guo et al., "LIGA-Stereo: Learning LiDAR Geometry Aware Representations for Stereo-based 3D Detector," ICCV, 2021, pp. 3153-3163, retrieved from https://openaccess.thecvf.com/content/ICCV2021/papers/Guo_LIGA-Stereo_Learning_LiDAR_Geometry_Aware_Representations_for_Stereo-Based_3D_Detector_ICCV_2021_paper.pdf.

Chen et al., "Point-Based Multi-View Stereo Network," ICCV, 2019, pp. 1538-1547, retrieved from https://openaccess.thecvf.com/content_ICCV_2019/papers/Chen_Point-Based_Multi-View_Stereo_Network_ICCV_2019_paper.pdf.

Liu et al., "BEVFusion: Multi-Task Multi-Sensor Fusion with Unified Bird's-Eye View Representation," arXiv, 2022, 12 pages, retrieved from https://arxiv.org/abs/2205.13542.

Rukhovich et al., "ImVoxelNet: Image to Voxels Projection for Monocular and Multi-View General-Purpose 3D Object Detection," WACV, 2022, pp. 2397-2406.

Reading et al., "Categorical Depth Distribution Network for Monocular 3D Object Detection," CVPR, 2021, pp. 8555-8564.

Li et al., "Unifying Voxel-based Representation with Transformer for 3D Object Detection," 36th Conference on Neural Information Processing Systems (NeurIPS), 2022, pp. 1-14.

Philion et al., "Lift, Splat, Shoot: Encoding Images from Arbitrary Camera Rigs by Implicitly Unprojecting to 3D," ECCV, 2020, pp. 1-17, retrieved from https://www.ecva.net/papers/eccv_2020/papers_ECCV/papers/123590188.pdf.

Wang et al., "DETR3D: 3D Object Detection from Multi-view Images via 3D-to-2D Queries," 5th Conference on Robot Learning (CoRL), 2021, pp. 1-12.

Carion et al., "End-to-End Object Detection with Transformers," ECCV, 2020, 17 pages, retrieved from https://www.ecva.net/papers/eccv_2020/papers_ECCV/papers/123460205.pdf.

Yin et al., "Multimodal Virtual Point 3D Detection," 35th Conference on Neural Information Processing Systems (NeurIPS), 2021, pp. 1-14.

Gokce et al., "Vision-Based Detection and Distance Estimation of Micro Unmanned Aerial Vehicles," Sensors, vol. 15, 2015, pp. 23805-23846.

Haseeb et al., "DisNet: A novel method for distance estimation from monocular camera," IROS, 2018, 6 pages, retrieved from https://project.inria.fr/ppniv18/files/2018/10/paper22.pdf.

Zhu et al., "Learning Object-Specific Distance From a Monocular Image," ICCV, 2019, 10 pages, retrieved from https://openaccess.thecvf.com/content_ICCV_2019/papers/Zhu_Learning_Object-Specific_Distance_From_a_Monocular_Image_ICCV_2019_paper.pdf.

Girshick et al., "Fast R-CNN," ICCV, 2015, pp. 1440-1448, retrieved from https://www.cv-foundation.org/openaccess/content_iccv_2015/papers/Girshick_Fast_R-CNN_ICCV_2015_paper.pdf.

Vaswani et al., "Attention Is All You Need," 31st Conference on Neural Information Processing Systems (NIPS), 2017, 11 pages.

Zhang et al., "Objects are Different: Flexible Monocular 3D Object Detection," CVPR, 2021, pp. 3289-3298.

Lu et al., "Geometry Uncertainty Projection Network for Monocular 3D Object Detection," arXiv, 2021, 11 pages, retrieved from https://arxiv.org/abs/2107.13774.

Mildenhall et al., "NeRF: Representing Scenes as Neural Radiance Fields for View Synthesis," ECCV, 2020, 17 pages, retrieved from https://www.ecva.net/papers/eccv_2020/papers_ECCV/papers/123460392.pdf.

Sun et al., "Scalability in Perception for Autonomous Driving: Waymo Open Dataset," CVPR, 2020, pp. 2446-2454.

Ranftl et al., "Vision Transformers for Dense Prediction," arXiv, 2021, 15 pages, retrieved from https://arxiv.org/abs/2103.13413.

Github, "MMDetection3D," GitHub, 2023, 11 pages, retrieved from https://github.com/open-mmlab/mmdetection3d.

Zhang et al., "Exploring Data Augmentation for Multi-Modality 3D Object Detection," arXiv, 2020, 12 pages, retrieved from https://arxiv.org/abs/2012.12741.

Wang et al., "PointAugmenting: Cross-Modal Augmentation for 3D Object Detection," CVPR, 2021, pp. 11794-11803.

* cited by examiner

100 compute a two-dimensional (2D) bounding box for an object in an image of a scene
102 process the 2D bounding box, using a neural network, to predict a three-dimensional (3D) bounding box for the object in the scene
104

400

600

DATA CENTER
900

APPLICATION LAYER 940

APPLICATION(s) 942

SOFTWARE LAYER 930

SOFTWARE 932

FRAMEWORK LAYER 920

JOB
SCHEDULER 932

CONFIGURATION
MANAGER 934

DISTRIBUTED FILE SYSTEM 938

RESOURCE MANAGER 936

DATA CENTER INFRASTRUCTURE LAYER 910

RESOURCE ORCHESTRATOR 912

GROUPED COMPUTING RESOURCES 914

715

NODE C.R.
916(1)

715

NODE C.R.
916(2)

715

○ ○ ○

NODE C.R.
916(N)

715

LONG-RANGE 3D OBJECT DETECTION USING 2D BOUNDING BOXES

RELATED APPLICATION(S)

This application claims the benefit of U.S. Provisional Application No. 63/440,326, titled "LONG-RANGE 3D OBJECT DETECTION USING 2D BOX SUPERVISION" and filed Jan. 20, 2023, the entire contents of which is incorporated herein by reference.

TECHNICAL FIELD

The present disclosure relates to the computer vision task of three-dimensional (3D) object detection.

BACKGROUND

Once essential task in computer vision is 3D object detection, which generally detects (e.g. classifies and localizes) objects in 3D space from the images or videos that capture the objects. This computer vision task has many useful applications, such as autonomous driving applications which rely on the detection of 3D objects in a local environment to make autonomous driving decisions. Currently, machine learning can be used for 3D object detection, but machine learning models must be trained on objects with abundant high-quality 3D annotations which include distance (e.g. from a source camera, such as that on a vehicle) which is usually computed using Light Detection and Ranging (lidar) points.

Lidar refers to a laser-based technology that determines range (distance) by targeting an object with a laser and measuring the time for the reflected light to return to the receiver. However, existing solutions for camera-based 3D object detection learn from datasets that relies on getting ground truths from Lidar. The ranges of the ground truths are thus limited by the effective range of lidar, which sometimes can be short (e.g., ~70 meters). This limitation does not support the detection of more distant 3D objects.

However, the detection of 3D objects beyond this limited lidar range is of importance in certain applications, including in particular autonomous driving applications where existing close or midrange 3D object detection does not always meet the safety-critical requirement of autonomous driving. Just by way of example, the detection of objects at a greater distance may be desired when certain road conditions are detected, such as wet roads or icy roads, since these conditions will affect a car's ability to stop.

There is a need for addressing these issues and/or other issues associated with the prior art. For example, there is a need to provide accurate 3D object detection beyond the current lidar range.

SUMMARY

A method, computer readable medium, and system are disclosed to provide 3D bounding box detection using two-dimensional (2D) bounding boxes. A 2D bounding box is computed for an object in an image of a scene. The 2D bounding box is processed, using a neural network, to predict a 3D bounding box for the object in the scene.

DETAILED DESCRIPTION

Figure 1:
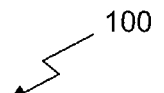
FIG. 1 illustrates a flowchart of a method for 3D bounding box detection, in accordance with an embodiment.

FIG. 1 illustrates a flowchart of a method 100 for 3D bounding box detection, in accordance with an embodiment. The method 100 may be performed by a device, which may be comprised of a processing unit, a program, custom circuitry, or a combination thereof, in an embodiment. In another embodiment a system comprised of a non-transitory memory storage comprising instructions, and one or more processors in communication with the memory, may execute the instructions to perform the method 100. In another embodiment, a non-transitory computer-readable media may store computer instructions which when executed by one or more processors of a device cause the device to perform the method 100.

In operation 102, a 2D bounding box is computed for an object in an image of a scene. The image of the scene may be captured by a camera, in an embodiment. The camera may be a static camera or a dynamic (moving) camera. As another example, the camera may be static but located on a dynamic object (e.g. a moving automobile). In another embodiment, the image may be a frame of video captured by the camera.

With respect to the present description, the object refers to any physical object located in the scene (e.g. environment) which is captured in the image. For example, the object may be a static object (e.g. a road, intersection, building, etc.) or a moving object (e.g. a human, automobile, bicycle, etc.). In an embodiment, the object may be selected, from among a plurality of objects in the image, as an object of interest. In particular, the object may be selected for the purpose of performing 3D detection on the object. The object may be selected from among other objects in the image based on some predefined criteria.

As mentioned, a 2D bounding box is computed for the object in the image. The 2D bounding box refers to a 2D shape (e.g. rectangle) that encloses the object in the image.

In an embodiment, the 2D bounding box may be defined by a position of the box (e.g. center point or top-left anchor point) and a size of the box (i.e. height/width).

In an embodiment, the 2D bounding box may be computed using a neural network configured to predict a 2D bounding box for a given object in an image. For example, the neural network (hereinafter 2D neural network) may be trained to predict the 2D bounding box based upon features of the given object. The features may be defined in a feature vector determined for the given object. The feature vector may be determined from the image of the scene, and may include for example data associated with an orientation of the object, data associated with a size of the object, data associated with a classification of the object, and/or other data associated with any other features of the object. In this case, the neural network may process features, or the feature vector, determined for the object of the present embodiment to compute, or predict, the 2D bounding box for the object in the image. In another embodiment, a camera calibration matrix may be used to compute the 2D bounding box for the object.

In operation 104, the 2D bounding box is processed, using a neural network, to predict a 3D bounding box for the object in the scene. With respect to the present description, the 3D bounding box refers to a 3D cuboid with orientation and a defined box center position in 3D space. The center position in 3D includes depth information. In an embodiment, the 3D bounding box may be defined by the 2D bounding box as well as a depth of the object. Accordingly, the 3D bounding box may indicate a depth of the object, where the depth is greater than a defined depth threshold (e.g. greater than a lidar range).

With respect to the present embodiment, the neural network used to predict the 3D bounding box may be different from the 2D neural network described above. In an embodiment, the neural network may be configured to predict a 3D bounding box for a given 2D bounding box computed for an object in an image. In an embodiment, the neural network may be trained to predict the 3D bounding box based upon the 2D bounding box as well as one or more features of the given object. As mentioned above, the features may be defined in the feature vector determined for the given object.

In an embodiment, the neural network may be trained on a dataset that includes labeled objects having a depth less than the defined depth threshold (e.g. within the defined lidar range). In an embodiment, the label for each of the labeled objects may indicate one or more features of the labeled object as well as a 3D bounding box for the labeled object (e.g. with depth computed using lidar technology). In an embodiment, the neural network may learn an inverse function for determining object depth from a given object 2D bounding box. To this end, in an embodiment, the neural network may process the feature vector representing the object together with the 2D bounding box to predict the 3D bounding box for the object in the scene.

As described herein, the method 100 provides 3D bounding box detection using a neural network that is conditioned on a 2D bounding box computed for the object. As also described, in an embodiment, the neural network may be trained on the 3D bounding boxes of objects having a depth less than a defined depth threshold (e.g. within a defined lidar range). In particular, a mapping between 2D bounding boxes and depth may be learned by the neural network using 3D supervision on objects within the defined depth threshold. However, the neural network, once trained, may infer 3D bounding boxes for objects having a depth greater than the defined depth threshold (e.g. greater than the defined lidar range), and as a result the method 100 may support long-range detection (i.e. detection beyond the lidar range and 3D label range).

In one embodiment of the implementation of the method 100, the 3D bounding box may be output for use as a ground truth in a dataset on which an additional neural network is trained to predict 3D bounding boxes for objects in a given scene. When output as the ground truth, the 3D bounding box may contain 1) box location (including depth) and size, 2) box classification, and 3) box orientation, where Box classification and Box orientation may be inherited. This additional neural network may be a 3D detector, in an embodiment. The method 100 may be repeated for various objects in various scenes to synthetically generate the 3D bounding box ground truths for those objects. In an embodiment, the method 100 may include training the additional neural network on the dataset of 3D bounding box ground truths to predict 3D bounding boxes for objects in a given scene.

In a further embodiment of the above possible implementation of the method 100, the additional neural network may be evaluated based on a dynamic detection metric. For example, the dynamic detection metric may allow for depth accuracy to be relaxed as object depth increases. In an exemplary embodiment, the additional neural network may be a camera-based 3D detector. In another exemplary embodiment, the method 100 may include using the camera-based 3D detector for an autonomous navigation application, such as an autonomous driving application. In yet another exemplary embodiment, the method 100 may include using the camera-based 3D detector for a robotics application.

Further embodiments will now be provided in the description of the subsequent figures. It should be noted that the embodiments disclosed herein with reference to the method 100 of FIG. 1 may apply to and/or be used in combination with any of the embodiments of the remaining figures below.

Figure 2:
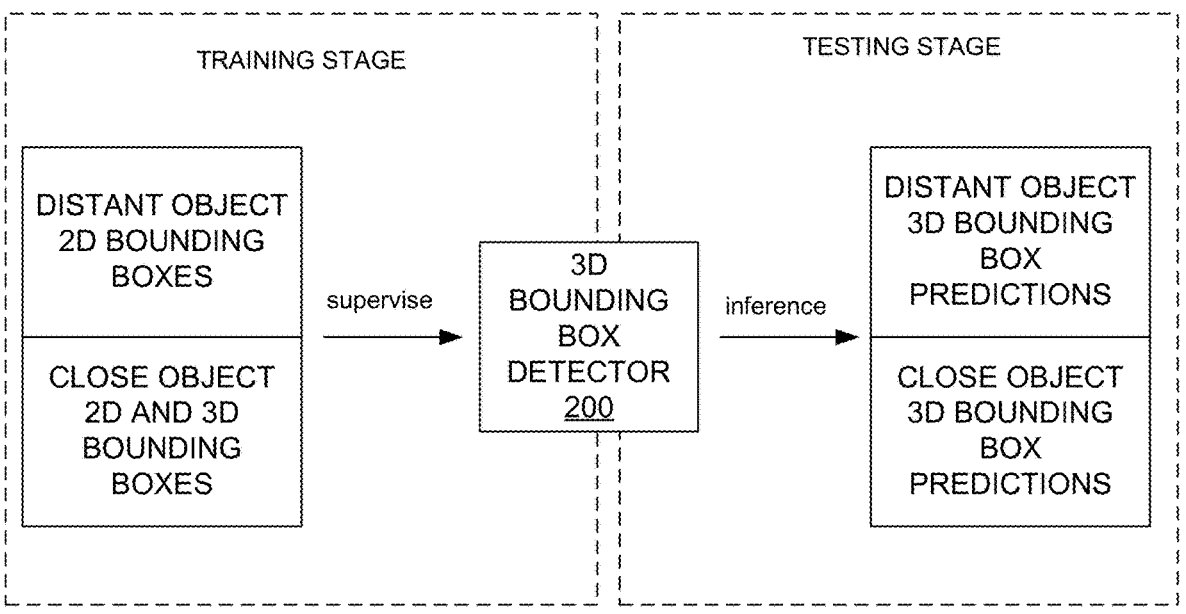
FIG. 2 illustrates a block diagram of the training and testing stages of a 3D bounding box detector, in accordance with an embodiment.

FIG. 2 illustrates a block diagram of the training and testing stages of a 3D bounding box detector 200, in accordance with an embodiment. In an embodiment, the 3D bounding box detector 200 may be the neural network disclosed in FIG. 1 that is configured for predicting the 3D bounding boxes for the given 2D bounding box.

The 3D bounding box detector 200 is a long-range 3D detection framework, also referred to herein as a long-range 3D object detector, that detects 3D bounding boxes of distant objects using only 2D supervision. In the present embodiment, a 3D bounding box includes location (with depth), size, and orientation of an object in an image of a scene.

As shown, during a training stage, the 3D bounding box detector 200 is trained based on annotated 2D bounding boxes for distant objects, where distant objects refer to objects outside of a predefined distance threshold (e.g. greater than the lidar range), as well as both annotated 2D and 3D bounding boxes for close objects, where close objects refer to objects within the predefined distance threshold (e.g. within the lidar range).

During a testing (i.e. inference) stage, which follows the training stage, the 3D bounding box detector 200 predicts 3D bounding boxes for both distant and close objects. In particular, given a 2D bounding box of an object, and in an embodiment also given the parameters of the camera, the 3D bounding box detector 200 predicts a 3D bounding box for the object.

Figure 3:
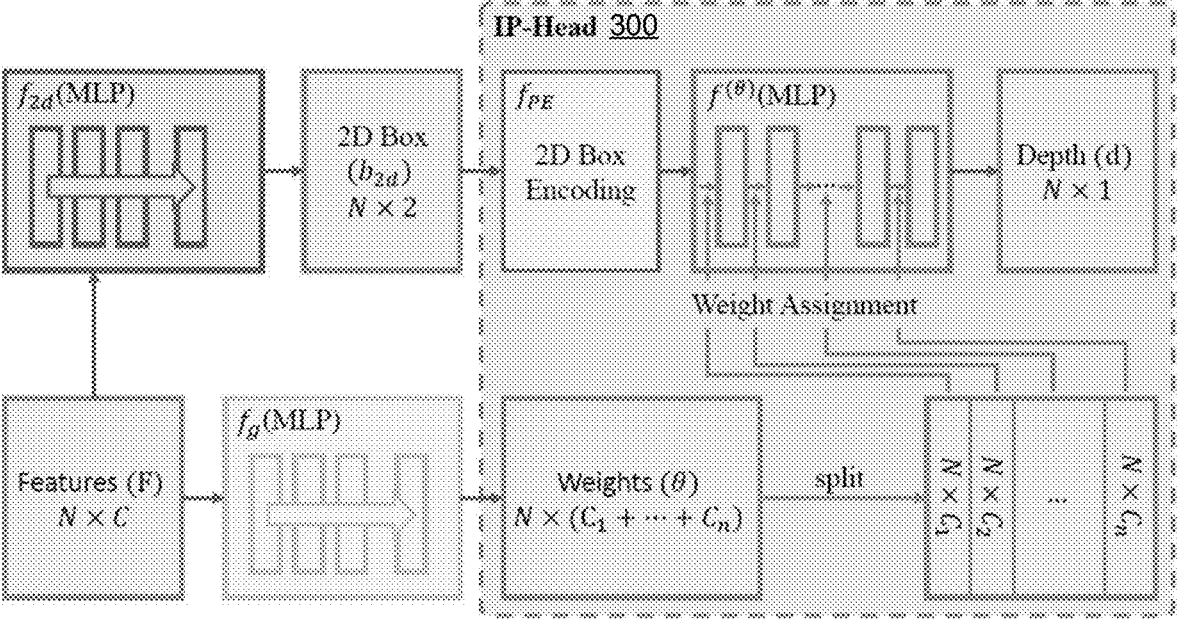
FIG. 3 illustrates a block diagram of the depth learning and inference module in a long range 3D bounding box annotator, in accordance with an embodiment.

FIG. 3 illustrates a block diagram of the depth learning and inference module in a long range 3D bounding box annotator 300, in accordance with an embodiment. In an embodiment, the 3D bounding box detector 300 may be the neural network disclosed in FIG. 1 that is configured for predicting the 3D bounding boxes for the given 2D bounding box. It should be noted that the 3D bounding box detector 300 is also referred to herein as an Implicit Projection head (IP-Head).

Given a 3D object with fixed depth, size, and orientation, through a camera calibration matrix, the corresponding projected 2D bounding box can be obtained (described by its width $w_{2d}$ and height $h_{2d}$) on the target image. A function $f$, determined by the camera calibration matrix, is used to indicate the mapping between depth (d), size (s), orientation (o) and 2D bounding box size ($b_{2d}=(w_{2d}, h_{2d})$) as in Equation 1.

$$f(d, s, o) = b_{2d} \qquad \text{Equation 1}$$

Equation 1 shows the ubiquitous relation between d and $b_{2d}$ if the object size s and orientation o are fixed—for objects with the same size and orientation, the further these objects are located, the smaller their projected 2D bounding boxes are on the image. Inspired by this fact, it is possible to estimate the inverse function $f^{-1}$ to transfer the 2D bounding box to the corresponding depth conditioned by s and o, formulated as in Equation 2.

$$f^{-1}(b_{2d} \,|\, s, o) = d \qquad \text{Equation 2}$$

With the power of neural networks to fit complicated functions, a small-size network with a multi-layer perceptron (MLP) is used to estimate the implicit inverse function $f^{-1}$. For simplicity, $f^{(\Theta)}$ is used to represent this network, of which the parameter weights are represented as $\theta$.

Since the implicit inverse function $f^{-1}$ depends on the size and orientation of the specific 3D objects, $f^{(\Theta)}$ should also be different across multiple objects, which means weights $\theta$ should be dynamic.

With these considerations, rather than utilizing a shared $\theta$ for all objects, a trainable MLP $f_g$ is used to generate a set of dynamic weights $\theta_i$ according to the features $F_i$ of each object i. Those $\theta_i$ are then used as the weights of network $f^{(\Theta)}$ to estimate the corresponding depth of the i-th 2D bounding box. This process generates the specific Implicit inverse function of each object to project its 2D bounding box to 3D depth.

This procedure is illustrated in FIG. 3, in which "2D Box Encoding", $f_{PE}$, is a positional encoding function to encode 2-channel 2D bounding box descriptors (with width $w_{2d}$ and height $h_{2d}$) into informative high-dimensional features and $f_{2d}$ is a 2D detection network for predicting 2D bounding boxes on the image. The overall procedure is formulated as in Equation 3.

$$d_i = f^{(f_g(F_i))}\big(f_{PE}(b_{2d_i})\big), \qquad \text{Equation 3}$$

where $f_g$ estimates the weights of $f^{\theta_i}$ from instance features $F_i$ to transfer the i-th 2D bounding boxes to its corresponding depth. Its condition information, including size $s_i$ and orientation $o_i$, is included in feature $F_i$, from which information can be obtained.

Figure 4A:
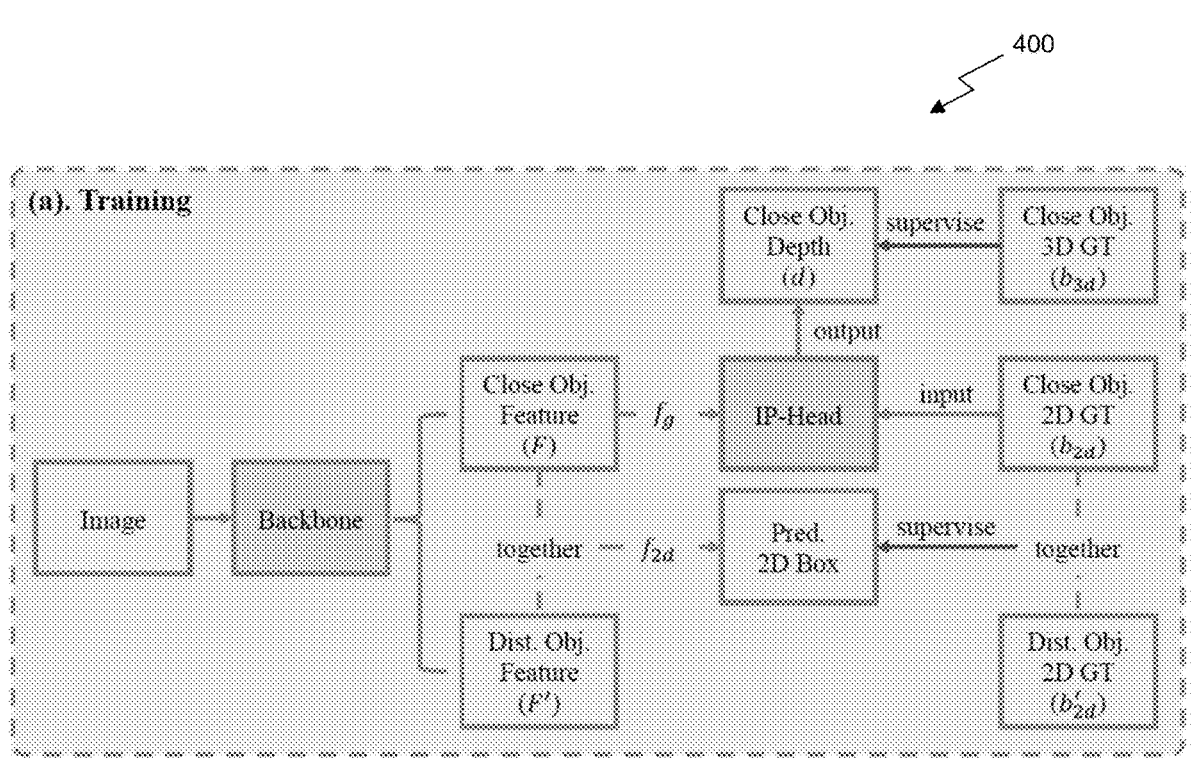
FIG. 4A illustrates a flowchart of a method for training the depth learning and inference module of FIG. 3, in accordance with an embodiment.

FIG. 4A illustrates a flowchart of a method 400 for training the depth learning and inference module of FIG. 3, in accordance with an embodiment.

During training, 2D/3D annotation pairs of close objects are used to supervise IP-Head 300 for obtaining a reliable dynamic weight generator $f_g$. Specifically, for a close object, after obtaining its corresponding dynamic weights, its 2D ground truth box is transferred for depth prediction by IP-Head 300, and $f_g$ is optimized by computing the loss between the predicted depth and the 3D annotation.

As described herein, the implicit inverse function $f^{(\Theta)}$ needs to model the relation between the 2D bounding box and corresponding depth, and further generate different depth predictions based on 2D bounding box input. To further improve effectiveness, an augmentation strategy may be employed, called projection augmentation. In this embodiment, more depth d and 2D bounding box $b_{2d}$ pairs are generated for each close object during training, so as to enable $f_g$ to estimate a more accurate $b_{2d}$-d relation.

These extra $b_{2d}$-d training pairs come from Equation 1. Given an object with fixed size and orientation, different depth values d* are randomly chosen, their corresponding 2D bounding boxes b*$_{2d}$ are calculated through Equation 1, and these augmented b*$_{2d}$-d* pairs are utilized, along with the ground truth $b_{2d}$-d pair, to train the IP-Head 300 for higher performance.

Figure 4B:
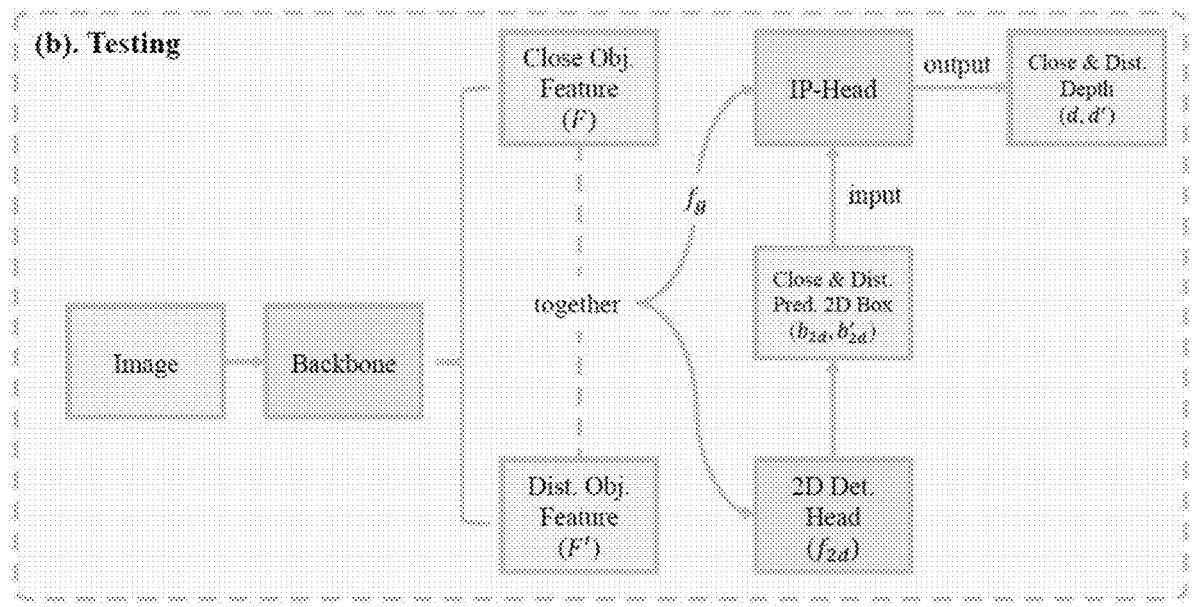
FIG. 4B illustrates a flowchart of a method for testing the depth learning and inference module of FIG. 3, in accordance with an embodiment.

FIG. 4B illustrates a flowchart of a method 450 for testing the depth learning and inference module of FIG. 3, in accordance with an embodiment.

During inference, the backbone network is used to extract instance features F'$_i$. Then, dynamic weights are extracted using $f_g$ and a detection network $f_{2d}$, supervised by a 2D bounding box ground truth, is used to predict the associated 2D bounding box b'$_{2d_i}$ as b'$_{2d_i}=f_{2d}(F'_i)$. Finally, Equation 3 is used to obtain depth predictions for each instance in the image.

Figure 5:
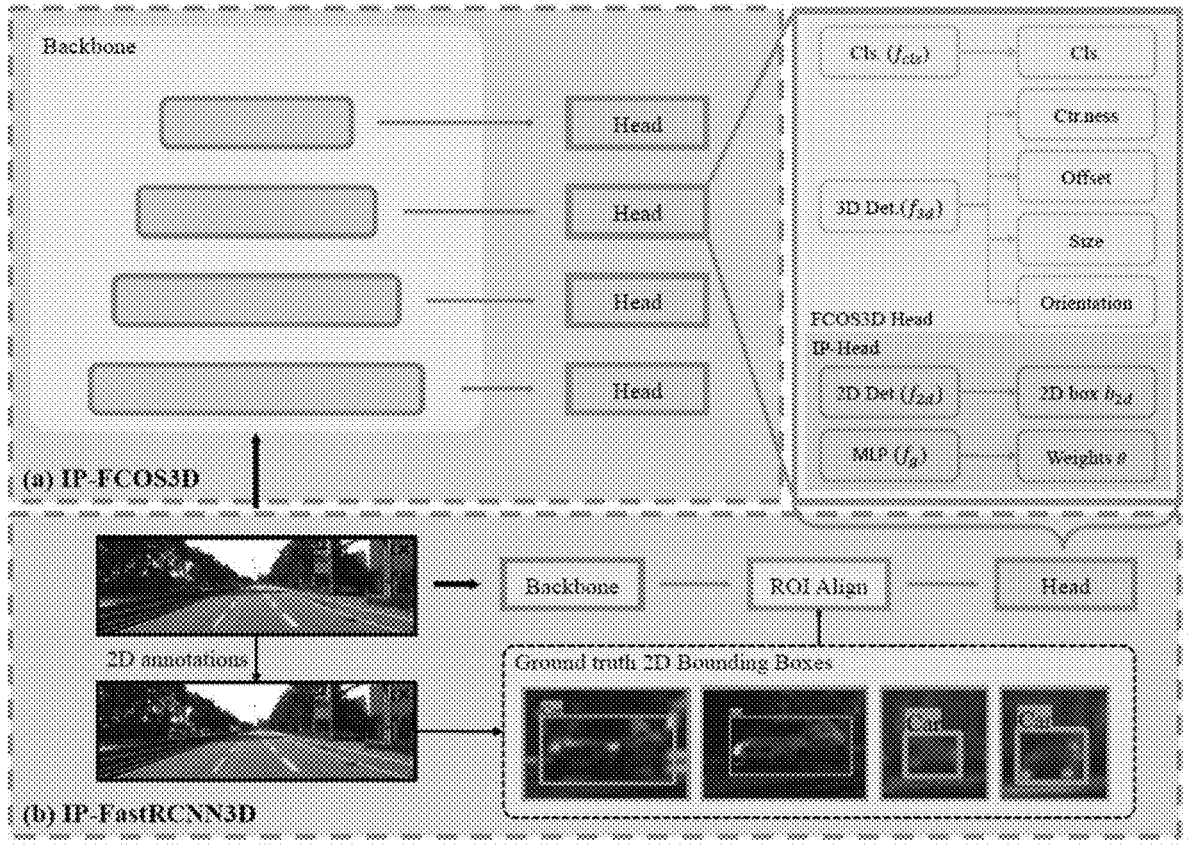
FIG. 5 illustrates a block diagram illustrating the implementations in which a standard 3D object detector is modified to include the depth learning and inference module of FIG. 3 to enable long-range 3D bounding box annotation, in accordance with an embodiment.

FIG. 5 illustrates a block diagram illustrating two implementations in which a standard 3D object detector is modified to instantiate a long range 3D bounding box annotator using the depth learning and inference module in FIG. 3, in accordance with an embodiment. It should be noted that these two illustrated implementations are set forth for exemplary purposes only, and can be used independent of one another.

The proposed IP-Head 300 can be used in existing monocular 3D detectors, like FCOS3D (Fully Convolutional One-Stage Monocular 3D Object Detection), to boost their performance in long-range 3D object detection. As illustrated in the present embodiments, only two additional branches, i.e., a 2D detection branch $f_{2d}$ and a weight generation MLP $f_g$, are needed to utilize IP-Head 300 in FCOS3D.

Figure 6:
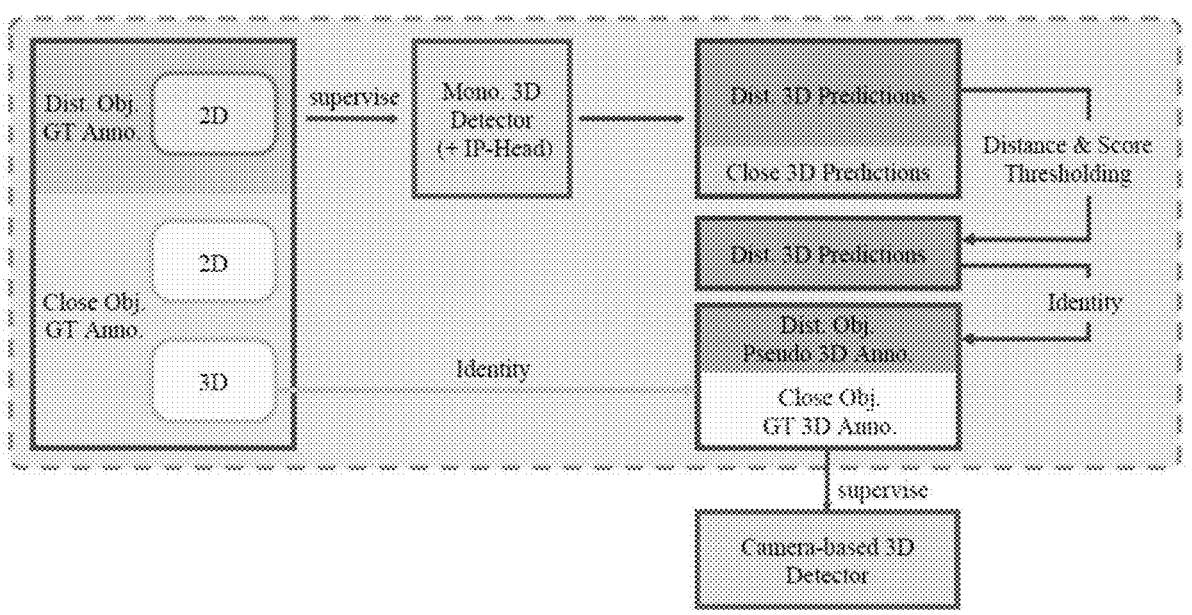
FIG. 6 illustrates a block diagram of a system for extending the long range 3D bounding box annotator of FIG. 5 to handle general camera-based 3D detection with multi-camera inputs, in accordance with an embodiment.

FIG. 6 illustrates a block diagram illustrating an implementation in which the long range 3D bounding box annotator of FIG. 5 is extended to handle general camera-based 3D detection with multi-camera inputs, in accordance with an embodiment. It should be noted that this illustrated implementation is set forth for exemplary purposes only.

Apart from monocular methods mentioned with respect to FIG. 5, IP-Head 300 may be extended to BEV (bird-eye-view) methods to alleviate their demand of 3D annotations. In an embodiment, a monocular method equipped with IP-Head 300 may be used as the detector of the long-range 3D object detector model which then serves as the long-range teacher to generate pseudo distant 3D annotations. With close 2D/3D annotations and distant 2D annotations, the long-range 3D object detector is applied to generate 3D predictions for distant objects. Then, these predictions are treated as pseudo 3D bounding box labels, which are, together with close 3D ground truths, taken as the whole supervision to train BEV methods.

Dynamic Detection Metric

For any neural network implementing IP-Head 300 (e.g. as disclosed with respect to FIGS. 5 and/or 6) such neural network may be evaluated based upon a dynamic detection metric, also referred to herein as Long-range Detection Score (LDS). As described below, this dynamic detection metric allows for depth accuracy to be relaxed as object depth increases.

In an embodiment, LDS is defined according to Equation 4.

$$LDS = \frac{1}{6}\left[3mAP + Rec \times \sum_{mTP \in \mathbb{TP}} (1 - \min(1, mTP))\right] \qquad \text{Equation 4}$$

where Rec is the recall rate and mTP represents the mean True Positive metric.

In LDS, mean average precision (mAP) is computed based on the relative distance error per Equation 5.

$$Rel. \; Dist. \; Err. = \frac{\|P_c - G_c\|}{G_d} \qquad \text{Equation 5}$$

where $P_c$, $G_c$ and $G_d$ represent the center of predicted 3D bounding box, center of ground truth 3D bounding box and the distance of ground truth 3D bounding box towards ego vehicle, respectively. Predictions with a relative error smaller than a threshold r are counted as true positive, and false positive otherwise, for computing average precision (AP). In an embodiment, 4 thresholds $\mathbb{R}$={0.025, 0.05, 0.1, 0.2} are chosen and the average is taken over these thresholds and the class set $\mathbb{C}$. Finally, mAP is obtained per Equation 6.

$$mAP = \frac{1}{|\mathbb{C}||\mathbb{R}|}\sum_{c \in \mathbb{C}}\sum_{r \in \mathbb{R}} AP_{c,r} \qquad \text{Equation 6}$$

Also, the recall rate and mTP are multiplied before adding to mAP. The mTP is utilized to measure errors on the location (mATE), size (mASE) and orientation (mAOE) for TP prediction, whose relative distance to the ground truth is smaller than r=0.1 during matching, mATE is computed as the relative distance, normalized by 0.1 to ensure range falling within 0 and 1.

mASE and mAOE are the same as those in nuScenes Dataset. The intuition of multiplying the recall rate to the mTP is simple. The larger the recall rate is, the more predictions are involved in the statistics of mTP. Compared to simply setting a recall threshold, the multiplication improvement adjusts the weight of mTP to LDS according to its comprehensiveness, and thus brings a more informative quantitative result.

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data. Details regarding inference and/or training logic 715 for a deep learning or neural learning system are provided below in conjunction with FIGS. 7A and/or 7B.

In at least one embodiment, inference and/or training logic 715 may include, without limitation, a data storage 701 to store forward and/or output weight and/or input/output data corresponding to neurons or layers of a neural network trained and/or used for inferencing in aspects of one or more embodiments. In at least one embodiment data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 701 may be included with other on-chip or off-chip data storage, including a processor's L1, L2, or L3 cache or system memory.

In at least one embodiment, any portion of data storage 701 may be internal or external to one or more processors or other hardware logic devices or circuits. In at least one embodiment, data storage 701 may be cache memory, dynamic randomly addressable memory ("DRAM"), static randomly addressable memory ("SRAM"), non-volatile memory (e.g., Flash memory), or other storage. In at least one embodiment, choice of whether data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a data storage 705 to store backward and/or output weight and/or input/output data corresponding to neurons or layers of a neural network trained and/or used for inferencing in aspects of one or more embodiments. In at least one embodiment, data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 705 may be included with other on-chip or off-chip data storage, including a processor's L1, L2, or L3 cache or system memory. In at least one embodiment, any portion of data storage 705 may be internal or external to on one or more processors or other hardware logic devices or circuits. In at least one embodiment, data storage 705 may be cache memory, DRAM, SRAM, non-volatile memory (e.g., Flash memory), or other storage. In at least one embodiment, choice of whether data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 701 and data storage 705 may be separate storage structures. In at least one embodiment, data storage 701 and data storage 705 may be same storage structure. In at least one embodiment, data storage 701 and data storage 705 may be partially same storage structure and partially separate storage structures. In at least one embodiment, any portion of data storage 701 and data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710 to perform logical and/or mathematical operations based, at least in part on, or indicated by, training and/or inference code, result of which may result in activations (e.g., output values from layers or neurons within a neural network) stored in an activation storage 720 that are functions of input/output and/or weight parameter data stored in data storage 701 and/or data storage 705. In at least one embodiment, activations stored in activation storage 720 are generated according to linear algebraic and or matrix-based mathematics performed by ALU(s) 710 in response to performing instructions or other code, wherein weight values stored in data storage 705 and/or data 701 are used as operands along with other values, such as bias values, gradient information, momentum values, or other parameters or hyperparameters, any or all of which may be stored in data storage 705 or data storage 701 or another storage on or off-chip. In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 701, data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware, or other hardware, such as field programmable gate arrays ("FPGAs").

Figure 7A:
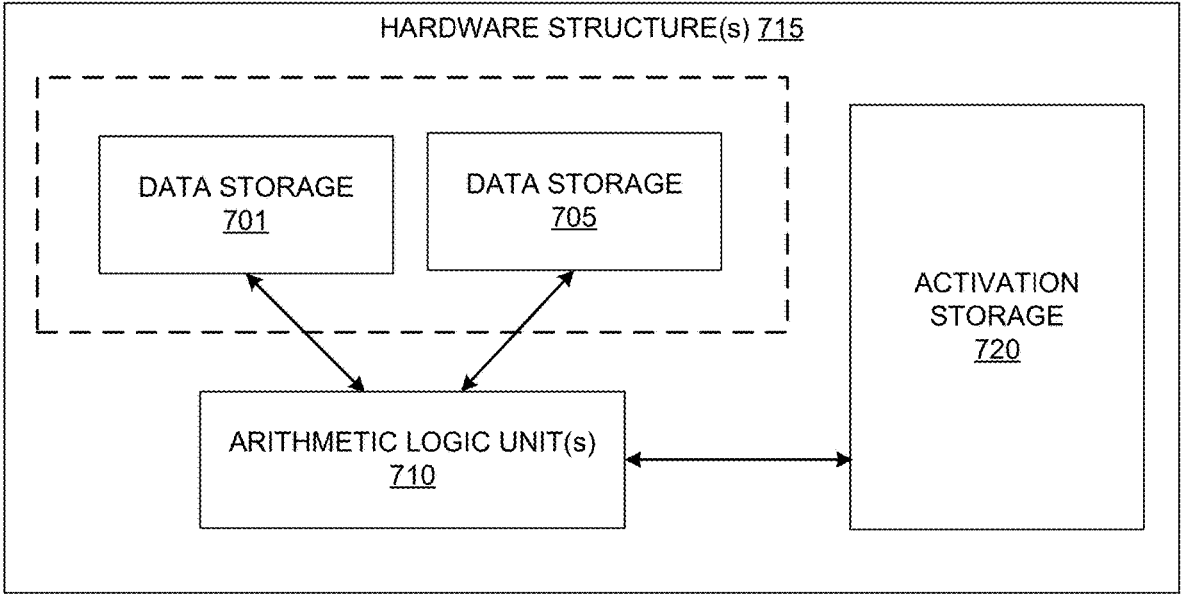
FIG. 7A illustrates inference and/or training logic, according to at least one embodiment.
Figure 7B:
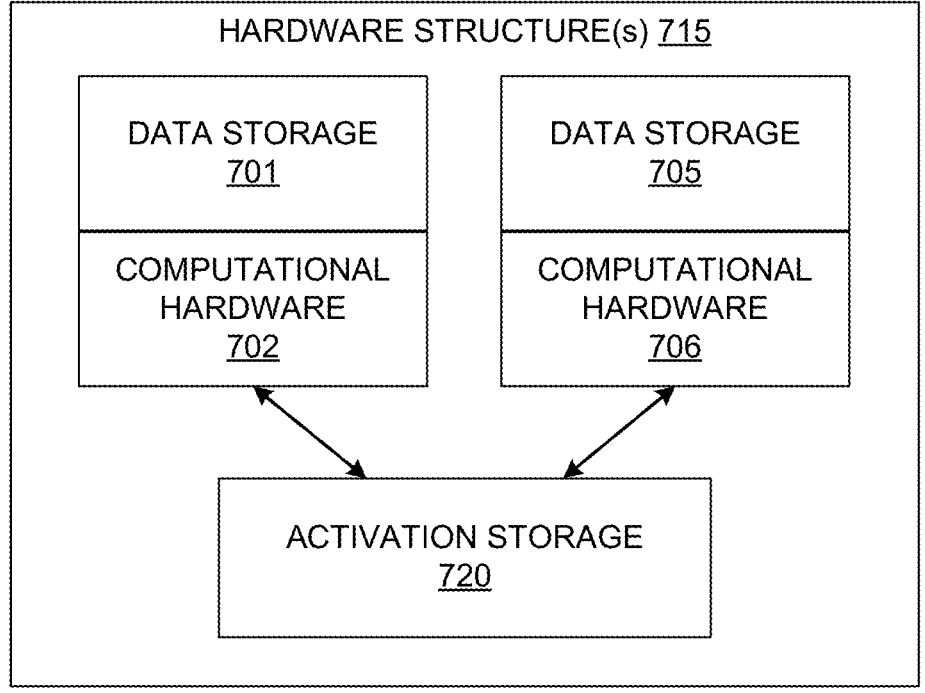
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, data storage 701 and data storage 705, which may be used to store weight values and/or other information, including bias values, gradient information, momentum values, and/or other parameter or hyperparameter information. In at least one embodiment illustrated in FIG. 7B, each of data storage 701 and data storage 705 is associated with a dedicated computational resource, such as computational hardware 702 and computational hardware 706, respectively. In at least one embodiment, each of computational hardware 706 comprises one or more ALUs that perform mathematical functions, such as linear algebraic functions, only on information stored in data storage 701 and data storage 705, respectively, result of which is stored in activation storage 720.

In at least one embodiment, each of data storage 701 and 705 and corresponding computational hardware 702 and 706, respectively, correspond to different layers of a neural network, such that resulting activation from one "storage/computational pair 701/702" of data storage 701 and computational hardware 702 is provided as an input to next "storage/computational pair 705/706" of data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Neural Network Training and Deployment

Figure 8:
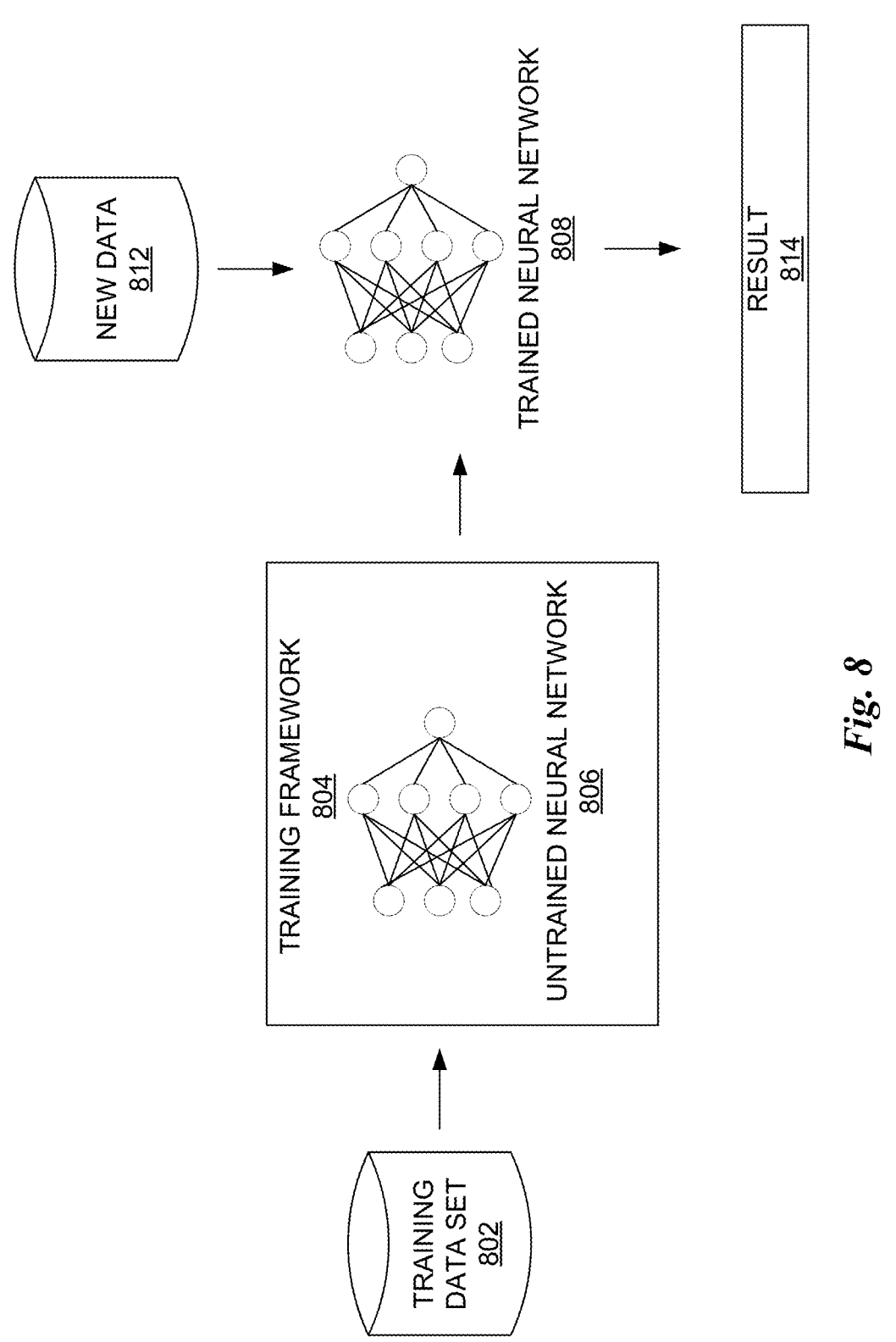
FIG. 8 illustrates training and deployment of a neural network, according to at least one embodiment.

FIG. 8 illustrates another embodiment for training and deployment of a deep neural network. In at least one embodiment, untrained neural network 806 is trained using a training dataset 802. In at least one embodiment, training framework 804 is a PyTorch framework, whereas in other embodiments, training framework 804 is a Tensorflow, Boost, Caffe, Microsoft Cognitive Toolkit/CNTK, MXNet, Chainer, Keras, Deeplearning4j, or other training framework. In at least one embodiment training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having known output and the output of the neural network is manually graded. In at least one embodiment, untrained neural network 806 is trained in a supervised manner processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on known input data, such as new data 812. In at least one embodiment, training framework 804 trains untrained neural network 806 repeatedly while adjust weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map, which is a type of trained neural network 808 capable of performing operations useful in reducing dimensionality of new data 812. In at least one embodiment, unsupervised training can also be used to perform anomaly detection, which allows identification of data points in a new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new data 812 without forgetting knowledge instilled within network during initial training.

Data Center

Figure 9:
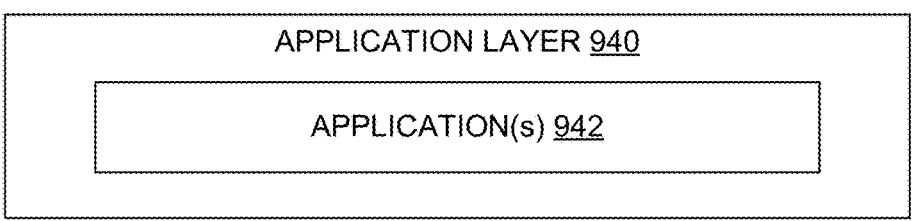
FIG. 9 illustrates an example data center system, according to at least one embodiment.
Figure 9:
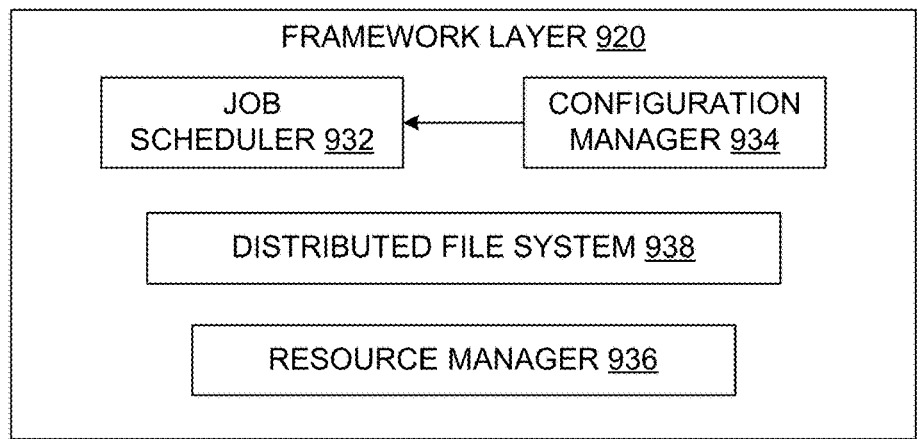
Figure 9:
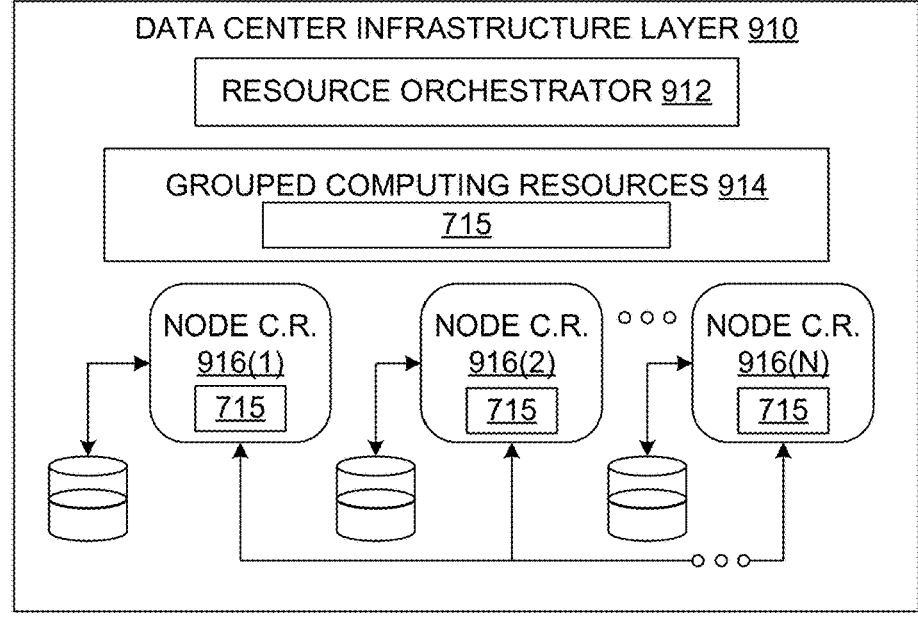

FIG. 9 illustrates an example data center 900, in which at least one embodiment may be used. In at least one embodiment, data center 900 includes a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 932, a configuration manager 934, a resource manager 936 and a distributed file system 938. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920 including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

As described herein, a method, computer readable medium, and system are disclosed for 3D bounding box detection. In accordance with FIGS. 1-6, embodiments may provide machine learning models usable for performing inferencing operations and for providing inferenced data. The machine learning models may be stored (partially or wholly) in one or both of data storage 701 and 705 in inference and/or training logic 715 as depicted in FIGS. 7A and 7B. Training and deployment of the machine learning models may be performed as depicted in FIG. 8 and described herein. Distribution of the machine learning models may be performed using one or more servers in a data center 900 as depicted in FIG. 9 and described herein.

What is claimed is:

1. A method, comprising:

at a device:

computing a two-dimensional (2D) bounding box for an object in an image of a scene;

processing the 2D bounding box, using a neural network, to predict a three-dimensional (3D) bounding box for the object in the scene;

output the 3D bounding box for use as a ground truth in a dataset on which a second neural network is trained to predict 3D bounding boxes for objects in a given scene; and train the second neural network to predict 3D bounding boxes for objects in a given scene, using the dataset;

wherein the second neural network is evaluated based on a dynamic detection metric that allows for depth accuracy to be relaxed as object depth increases.

2. The method of claim 1, wherein the image of the scene is captured by a camera.

3. The method of claim 1, wherein a camera calibration matrix is used to compute the 2D bounding box for the object.

4. The method of claim 1, wherein the 2D bounding box is defined by a width value and a height value.

5. The method of claim 1, wherein the neural network further processes a feature vector representing the object together with the 2D bounding box to predict the 3D bounding box for the object in the scene.

6. The method of claim 5, wherein the feature vector is determined from the image of the scene.

7. The method of claim 6, wherein the feature vector includes data associated with an orientation of the object.

8. The method of claim 6, wherein the feature vector includes data associated with a size of the object.

9. The method of claim 6, wherein the feature vector includes data associated with a classification of the object.

10. The method of claim 1, wherein the neural network is trained on a dataset that includes labeled objects having a depth less than a defined depth threshold, wherein the label for each of the labeled objects indicates:

one or more features of the labeled object, a 3D bounding box for the labeled object.

11. The method of claim 10, wherein the neural network learns an inverse function for determining object depth from a given object 2D bounding box.

12. The method of claim 1, wherein a depth of the object is greater than a defined depth threshold.

13. The method of claim 1, wherein the 3D bounding box indicates a depth of the object.

14. The method of claim 1, wherein the second neural network is a camera-based 3D detector.

15. The method of claim 14, wherein the device further:

uses the camera-based 3D detector for an autonomous navigation application.

16. The method of claim 15, wherein autonomous navigation application is an autonomous driving application.

17. The method of claim 14, wherein the device further:

uses the camera-based 3D detector for a robotics application.

18. A system, comprising:

a non-transitory memory storage comprising instructions; and one or more processors in communication with the memory, wherein the one or more processors execute the instructions to:

compute a two-dimensional (2D) bounding box for an object in an image of a scene;

process the 2D bounding box, using a neural network, to predict a three-dimensional (3D) bounding box for the object in the scene;

output the 3D bounding box for use as a ground truth in a dataset on which a second neural network is trained to predict 3D bounding boxes for objects in a given scene; and train the second neural network to predict 3D bounding boxes for objects in a given scene, using the dataset;

wherein the second neural network is evaluated based on a dynamic detection metric that allows for depth accuracy to be relaxed as object depth increases.

19. A non-transitory computer-readable media storing computer instructions which when executed by one or more processors of a device cause the device to:

compute a two-dimensional (2D) bounding box for an object in an image of a scene;

process the 2D bounding box, using a neural network, to predict a three-dimensional (3D) bounding box for the object in the scene;

output the 3D bounding box for use as a ground truth in a dataset on which a second neural network is trained to predict 3D bounding boxes for objects in a given scene; and train the second neural network to predict 3D bounding boxes for objects in a given scene, using the dataset;

wherein the second neural network is evaluated based on a dynamic detection metric that allows for depth accuracy to be relaxed as object depth increases.

* * * * *